(12) United States Patent
Takeuchi et al.

(10) Patent No.: US 12,266,759 B2
(45) Date of Patent: Apr. 1, 2025

(54) POSITIVE ELECTRODE MATERIAL AND BATTERY

(71) Applicant: Panasonic Intellectual Property Management Co., Ltd., Osaka (JP)

(72) Inventors: Kaori Takeuchi, Osaka (JP); Yoshiaki Tanaka, Kyoto (JP); Izuru Sasaki, Aichi (JP); Tetsuya Asano, Nara (JP); Akihiro Sakai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 177 days.

(21) Appl. No.: 18/064,314

(22) Filed: Dec. 12, 2022

(65) Prior Publication Data

US 2023/0106765 A1     Apr. 6, 2023

Related U.S. Application Data

(63) Continuation of application No. PCT/JP2021/022960, filed on Jun. 16, 2021.

(30) Foreign Application Priority Data

Jun. 29, 2020   (JP) ................................ 2020-111650

(51) Int. Cl.
   *H01M 10/0562* (2010.01)
   *H01M 4/505* (2010.01)
   (Continued)

(52) U.S. Cl.
   CPC ....... *H01M 10/0562* (2013.01); *H01M 4/505* (2013.01); *H01M 4/525* (2013.01);
   (Continued)

(58) Field of Classification Search
   CPC ..... H01M 10/0562; H01M 2300/0065; H01M 2300/0071; H01M 2300/008
   See application file for complete search history.

(56) References Cited

U.S. PATENT DOCUMENTS 10,892,480 B2 *  1/2021  Goto ..................... H01M 4/382
11,749,803 B2 *  9/2023  Matsumura ......... H01M 50/431
                                                              429/322
(Continued)

FOREIGN PATENT DOCUMENTS

CN      109546096 A      3/2019
DE   102018221828 A1 *   6/2020
(Continued)

OTHER PUBLICATIONS

The EPC Office Action dated Nov. 27, 2023 for the related European Patent Application No. 21833322.7.
(Continued)

*Primary Examiner* — Amanda C. Walke
(74) *Attorney, Agent, or Firm* — Rimon P.C.

(57) ABSTRACT

A positive electrode material includes: a positive electrode active material; a coating layer covering at least part of the surface of the positive electrode active material; and a second solid electrolyte. The coating layer includes a first solid electrolyte. The first solid electrolyte includes Li, M1 and F. M1 is at least one selected from the group consisting of Ti, Al and Zr. The second solid electrolyte includes Li, M2, O and X. M2 is at least one selected from the group consisting of Ta and Nb. X is at least one selected from the group consisting of F, Cl, Br and I.

17 Claims, 4 Drawing Sheets

(51) Int. Cl.
  *H01M 4/525* (2010.01)
  *H01M 10/0525* (2010.01)
  *H01M 4/02* (2006.01)
(52) U.S. Cl.
  CPC .. *H01M 10/0525* (2013.01); *H01M 2004/028* (2013.01); *H01M 2300/0068* (2013.01)

(56) References Cited

U.S. PATENT DOCUMENTS

| | | | |
|---|---|---|---|
| 2015/0263341 A1 | 9/2015 | Kato et al. | |
| 2019/0097219 A1 | 3/2019 | Goto | |
| 2020/0144575 A1* | 5/2020 | Ku | H01M 4/587 |
| 2022/0102753 A1* | 3/2022 | Tanaka | H01M 4/621 |
| 2022/0102755 A1* | 3/2022 | Miyatake | H01M 4/13 |
| 2022/0209287 A1* | 6/2022 | Tanaka | H01M 10/052 |
| 2022/0246983 A1* | 8/2022 | Suzuki | H01M 10/052 |
| 2022/0393242 A1* | 12/2022 | Han | H01M 10/0569 |
| 2023/0042911 A1* | 2/2023 | Sasaki | H01M 4/36 |
| 2023/0106765 A1* | 4/2023 | Takeuchi | C01G 35/006 429/323 |
| 2023/0268550 A1* | 8/2023 | Tanaka | H01B 1/08 429/323 |
| 2023/0307704 A1* | 9/2023 | Tanaka | H01M 10/0562 |
| 2024/0047680 A1* | 2/2024 | Miyamoto | H01M 4/36 |
| 2024/0145704 A1* | 5/2024 | Miyamoto | H01M 4/366 |
| 2024/0178383 A1* | 5/2024 | Sagara | H01M 4/485 |

FOREIGN PATENT DOCUMENTS

| | | |
|---|---|---|
| EP | 3671900 A1 | 6/2020 |
| EP | 3736824 A1 | 11/2020 |
| EP | 3736892 A1 | 11/2020 |
| JP | 2006-244734 | 9/2006 |

OTHER PUBLICATIONS

International Search Report of PCT application No. PCT/JP2021/022960 dated Aug. 17, 2021.

English Translation of Chinese Search Report dated Feb. 23, 2024 for the related Chinese Patent Application No. 202180043242.7.

* cited by examiner

POSITIVE ELECTRODE MATERIAL AND BATTERY

BACKGROUND

1. Technical Field

The present disclosure relates to a positive electrode material for a battery and to a battery.

2. Description of the Related Art

Japanese Unexamined Patent Application Publication No. 2006-244734 discloses a battery that uses a solid electrolyte containing In as a cation and a halogen element such as Cl, Br or I as an anion.

SUMMARY

In the related art, it is desired to suppress an increase in internal resistance of a battery during charging.

In one general aspect, the techniques disclosed here feature a positive electrode material that includes a positive electrode active material; a coating layer covering at least part of the surface of the positive electrode active material, the coating layer including a first solid electrolyte; and a second solid electrolyte, wherein the first solid electrolyte includes Li, M1 and F, M1 is at least one selected from the group consisting of Ti, Al and Zr, the second solid electrolyte includes Li, M2, O and X, M2 is at least one selected from the group consisting of Ta and Nb, and X is at least one selected from the group consisting of F, Cl, Br and I.

According to the present disclosure, it is possible to suppress an increase in internal resistance of a battery during charging.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
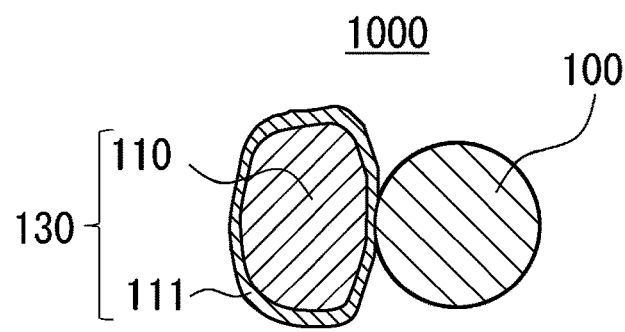
FIG. 1 is a sectional view illustrating a schematic configuration of a positive electrode material according to embodiment 1.

DETAILED DESCRIPTIONS (Underlying Knowledge Forming Basis of the Present Disclosure)

Patent Literature 1 discloses an all-solid-state lithium secondary battery that uses a solid electrolyte composed of a compound containing In as a cation and a halogen element such as Cl, Br or I as an anion. The battery is described to exhibit good charge/discharge characteristics when the average potential versus Li of a positive electrode active material is less than or equal to 3.9 V. It is described that this potential versus Li of the positive electrode active material suppresses the formation of a film of a decomposition product by oxidative decomposition, thus allowing the battery to exhibit good charge/discharge characteristics. Furthermore, Patent Literature 1 discloses that the positive electrode active materials having an average potential of less than or equal to 3.9 V versus Li may be exemplified by typical layered transition metal oxides such as $LiCoO_2$ and $LiNi_{0.8}Co_{0.15}Al_{0.05}O_2$.

Meanwhile, the present inventors carried out extensive studies on the resistance of halide solid electrolytes to oxidative decomposition. As a result, the present inventors have found that the solid electrolytes exhibit various levels of resistance to oxidative decomposition depending on the types of elements contained as anions. Here, the halide solid electrolytes are solid electrolytes that contain a halogen element such as F, Cl, Br or I as an anion.

Specifically, the present inventors have found that when a halide solid electrolyte containing a single kind of element selected from the group consisting of Cl, Br and I is used in a positive electrode material, the halide solid electrolyte is oxidatively decomposed during charging even in the case where use is made of a positive electrode active material having an average potential of less than or equal to 3.9 V versus Li. Furthermore, the present inventors have found that the oxidative decomposition of the halide solid electrolyte forms an oxidative decomposition product that functions as a resistance layer to give rise to an increase in internal resistance of the battery during charging. This increase in internal resistance of the battery during charging probably stems from the oxidation reaction of the single kind of element selected from the group consisting of Cl, Br and I present in the halide solid electrolyte. While the oxidation reaction usually indicates the charging reaction in which lithium ions and electrons are extracted from a positive electrode active material in a positive electrode material, the oxidation reaction used herein also means the side reaction in which electrons are extracted also from a halide solid electrolyte that is in contact with the positive electrode active material and contains a single kind of element selected from the group consisting of Cl, Br and I. Halogen elements have a relatively large ionic radius, and the interaction force between a cation component and a halogen element in a halide solid electrolyte is small. Probably because of this fact, a halide solid electrolyte easily undergoes oxidation reaction. This oxidation reaction forms an oxidative decomposition layer having poor lithium ion conductivity between the positive electrode active material and the halide solid electrolyte. This oxidative decomposition layer functions as a large interfacial resistance in the electrode reaction at the positive electrode, and thus probably brings about an increase in internal resistance of the battery during charging.

Furthermore, the present inventors have revealed that a battery that uses a fluorine-containing halide solid electrolyte in a positive electrode material exhibits excellent oxidation resistance and can attain no or a small increase in internal resistance of the battery during charging. The details of the mechanism are not clear but are probably as follows. Fluorine has the highest electronegativity among the halogen elements. When fluorine is contained in a halide solid electrolyte, the fluorine strongly bonds to the cation and is consequently less prone to oxidation reaction, that is, the fluorine hardly undergoes the side reaction in which the fluorine is deprived of electrons.

Based on the findings described above, the present inventors have reached a positive electrode material of the present disclosure that allows a battery to attain no or a small increase in internal resistance during charging.

(Summary of Aspects of the Present Disclosure)

A positive electrode material according to the first aspect of the present disclosure includes:
 a positive electrode active material;
 a coating layer covering at least part of the surface of the positive electrode active material, the coating layer including a first solid electrolyte; and
 a second solid electrolyte, wherein
 the first solid electrolyte includes Li, M1 and F,
 M1 is at least one selected from the group consisting of Ti, Al and Zr,
 the second solid electrolyte includes Li, M2, O and X,
 M2 is at least one selected from the group consisting of Ta and Nb, and
 X is at least one selected from the group consisting of F, Cl, Br and I.

The above configuration can suppress an increase in internal resistance of a battery during charging.

In the second aspect of the present disclosure, for example, the positive electrode material according to the first aspect may be such that the second solid electrolyte includes a crystal phase giving rise to a peak at a diffraction angle 2θ in the range of greater than or equal to 11.05° and less than or equal to 13.86° in an X-ray diffraction pattern obtained by X-ray diffractometry using Cu-Kα radiation. This configuration ensures that paths for the diffusion of lithium ions are easily formed and thus the second solid electrolyte attains high lithium ion conductivity.

In the third aspect of the present disclosure, for example, the positive electrode material according to the first aspect or the second aspect may be such that the second solid electrolyte has a Li to M2 molar ratio Li/M2 of greater than or equal to 0.60 and less than or equal to 2.4, and an O to X molar ratio O/X of greater than or equal to 0.16 and less than or equal to 0.35. This configuration ensures that a crystal phase having high lithium ion conductivity is formed easily in the second solid electrolyte and thus the second solid electrolyte attains higher lithium ion conductivity.

In the fourth aspect of the present disclosure, for example, the positive electrode material according to any one of the first to third aspects may be such that the second solid electrolyte has a Li to M2 molar ratio Li/M2 of greater than or equal to 0.96 and less than or equal to 1.20. This configuration ensures that a crystal phase having high lithium ion conductivity is formed more easily in the second solid electrolyte and thus the second solid electrolyte attains higher lithium ion conductivity.

In the fifth aspect of the present disclosure, for example, the positive electrode material according to any one of the first to fourth aspects may be such that M1 in the first solid electrolyte is at least one selected from the group consisting of Ti and Al. The first solid electrolyte satisfying this configuration has high lithium ion conductivity and also has high oxidation resistance.

In the sixth aspect of the present disclosure, for example, the positive electrode material according to the fifth aspect may be such that the first solid electrolyte includes $Li_{2.6}Ti_{0.4}Al_{0.6}F_6$. The first solid electrolyte satisfying this configuration has higher lithium ion conductivity. Thus, the interfacial resistance between the first solid electrolyte and the positive electrode active material can be reduced.

In the seventh aspect of the present disclosure, for example, the positive electrode material according to any one of the first to fourth aspects may be such that M1 in the first solid electrolyte is Zr. The first solid electrolyte satisfying this configuration has high lithium ion conductivity. Thus, the interfacial resistance between the first solid electrolyte and the positive electrode active material can be reduced.

In the eighth aspect of the present disclosure, for example, the positive electrode material according to the seventh aspect may be such that the first solid electrolyte includes $Li_2ZrF_6$. The first solid electrolyte satisfying this configuration has higher lithium ion conductivity. Thus, the interfacial resistance between the first solid electrolyte and the positive electrode active material can be further reduced.

In the ninth aspect of the present disclosure, for example, the positive electrode material according to any one of the first to eighth aspects may be such that the positive electrode active material includes lithium nickel cobalt manganese oxide. The positive electrode active material satisfying this configuration can offer enhancements in energy density and charge/discharge efficiency of a battery.

A battery according to the tenth aspect of the present disclosure includes:
 a positive electrode including the positive electrode material according to any one of the first to ninth aspects;
 a negative electrode; and
 an electrolyte layer disposed between the positive electrode and the negative electrode.

The above configuration can suppress an increase in internal resistance of the battery during charging.

In the eleventh aspect of the present disclosure, for example, the battery according to the tenth aspect may be such that the electrolyte layer includes a third solid electrolyte, and the third solid electrolyte is a solid electrolyte having an identical composition to the first solid electrolyte or is a solid electrolyte having an identical composition to the second solid electrolyte or including an identical crystal phase to the second solid electrolyte. The battery satisfying this configuration can attain enhancements in output density and charge/discharge characteristics.

In the twelfth aspect of the present disclosure, for example, the battery according to the eleventh aspect may be such that the third solid electrolyte is a solid electrolyte having an identical composition to the first solid electrolyte. The battery satisfying this configuration can attain further enhancements in output density and charge/discharge characteristics.

Hereinbelow, embodiments of the present disclosure will be described with reference to the drawings.

Embodiment 1

FIG. 1 is a sectional view illustrating a schematic configuration of a positive electrode material 1000 according to the embodiment 1.

The positive electrode material 1000 in the embodiment 1 includes a coated active material 130 and a second solid electrolyte 100. The coated active material 130 includes a positive electrode active material 110 and a coating layer 111. For example, the shape of the positive electrode active material 110 is particulate. The coating layer 111 covers at least part of the surface of the positive electrode active material 110.

The coating layer 111 is a layer including a first solid electrolyte. The coating layer 111 is disposed on the surface of the positive electrode active material 110. The coating layer 111 may exclusively include the first solid electrolyte. The phrase "exclusively include the first solid electrolyte" means that no materials other than the first solid electrolyte are intentionally added except for inevitable impurities. For example, the inevitable impurities include raw materials for the first solid electrolyte, and byproducts occurring during the preparation of the first solid electrolyte.

For example, the shape of the second solid electrolyte 100 is particulate. The second solid electrolyte 100 ensures that the positive electrode material 1000 will exhibit sufficient ion conductivity.

The positive electrode active material 110 is separated from the second solid electrolyte 100 by the coating layer 111. The positive electrode active material 110 may be out of direct contact with the second solid electrolyte 100 because the coating layer 111 is ion conductive.

The coating layer 111 may cover the positive electrode active material 110 uniformly. The coating layer 111 isolates the positive electrode active material 110 from direct contact with the second solid electrolyte 100 and suppresses the side reaction of the second solid electrolyte 100. As a result, the charge/discharge efficiency of a battery may be enhanced, and the increase in reaction overvoltage of a battery may be suppressed.

The coating layer 111 may cover only part of the surface of the positive electrode active material 110. Particles of the positive electrode active material 110 are placed in direct contact with one another through the portions exposed from the coating layer 111, and consequently the electron conductivity between the particles of the positive electrode active material 110 is enhanced to allow a battery to be operated at a high output.

For example, the thickness of the coating layer 111 may be greater than or equal to 1 nm and less than or equal to 500 nm.

The coating layer 111 having a thickness of greater than or equal to 1 nm isolates the positive electrode active material 110 from contact with the second solid electrolyte 100 and may suppress the side reaction of the second solid electrolyte 100. Thus, the charge/discharge efficiency of a battery can be enhanced.

Furthermore, the internal resistance of a battery ascribed to the thickness of the coating layer 111 can be sufficiently reduced by limiting the thickness of the coating layer 111 to less than or equal to 500 nm. Thus, the energy density of a battery can be enhanced.

The thickness of the coating layer 111 may be measured by any method without limitation. For example, the thickness of the first solid electrolyte may be determined by direct observation using a device such as a transmission electron microscope. Alternatively, the thickness of the coating layer 111 may be determined by following the change in the XPS spectrum assigned to the active material while removing the coating layer 111 with Ar sputtering.

The positive electrode active material 110, the coating layer 111, and the second solid electrolyte 100 will be described in more detail.

(Coating Layer 111)

The first solid electrolyte present in the coating layer 111 contains Li, M1 and F. M1 is at least one selected from the group consisting of Ti, Al and Zr. That is, the first solid electrolyte is a F-containing halide solid electrolyte.

A battery that uses a F-containing halide solid electrolyte in a positive electrode material exhibits excellent oxidation resistance and may attain no or a small increase in internal resistance of the battery during charging. The details of the mechanism are not clear but are probably as follows. Fluorine has a higher electronegativity than other halogen elements. When a halide solid electrolyte contains F as an anion, the fluorine strongly bonds to the cation and is consequently less prone to oxidation reaction, that is, the fluorine hardly undergoes the side reaction in which the fluorine is deprived of electrons.

For the reasons described above, the first solid electrolyte that contains Li, M1 and F and in which M1 is at least one selected from the group consisting of Ti, Al and Zr exhibits high oxidation resistance. Thus, the use of the first solid electrolyte in the positive electrode material makes it possible to suppress an increase in internal resistance during charging.

To further increase the lithium ion conductivity, the first solid electrolyte may consist essentially of Li, M1 and F. Here, the phrase "the first solid electrolyte consists essentially of Li, M1 and F" means that the molar ratio of the total of the amounts of substance of Li, M1 and F relative to the total of the amounts of substance of all the elements constituting the first solid electrolyte is greater than or equal to 90%. As an example, the molar ratio may be greater than or equal to 95%.

To further enhance the lithium ion conductivity, the first solid electrolyte may consist solely of Li, M1 and F.

In the first solid electrolyte, M1 may be at least one selected from the group consisting of Ti and Al.

The first solid electrolyte satisfying the above configuration attains high lithium ion conductivity and exhibits high oxidation resistance.

The first solid electrolyte may include $Li_{2.6}Ti_{0.4}Al_{0.6}F_6$.

The first solid electrolyte satisfying the above configuration exhibits higher ion conductivity and thus can realize a lower resistance at the interface between the first solid electrolyte and the positive electrode active material.

In the first solid electrolyte, M1 may be Zr.

The first solid electrolyte satisfying the above configuration exhibits higher ion conductivity and thus can realize a lower resistance at the interface between the first solid electrolyte and the positive electrode active material.

The first solid electrolyte may include $Li_2ZrF_6$.

The first solid electrolyte satisfying the above configuration exhibits higher ion conductivity and thus can realize a lower resistance at the interface between the first solid electrolyte and the positive electrode active material.

The first solid electrolyte may be free from Y (yttrium). Furthermore, the halide solid electrolyte may be free from sulfur. The first solid electrolyte may be free from sulfur.

(Second Solid Electrolyte)

The second solid electrolyte 100 contains Li, M2, O and X. M2 is at least one selected from the group consisting of Ta and Nb. X is at least one selected from the group consisting of F, Cl, Br and I. That is, the second solid electrolyte is a halide solid electrolyte that contains at least one selected from the group consisting of F, Cl, Br and I. The second solid electrolyte may be a halide solid electrolyte that contains at least one selected from the group consisting of Cl, Br and I. For example, the second solid electrolyte may contain F and at least one selected from the group consisting of Cl, Br and I.

The second solid electrolyte 100 has high lithium ion conductivity. Thus, a favorable interface is formed between the second solid electrolyte 100 and the first solid electrolyte to lower the charge transfer resistance between the second solid electrolyte 100 and the positive electrode active material. Here, the high lithium ion conductivity is, for example, greater than or equal to $1 \times 10^{-3}$ mS/cm. That is, the second solid electrolyte 100 according to the embodiment 1 may have an ion conductivity of, for example, greater than or equal to $1 \times 10^{-3}$ mS/cm.

To further enhance the lithium ion conductivity, the second solid electrolyte 100 may consist essentially of Li, M2, O and X. Here, the phrase "the second solid electrolyte 100 consists essentially of Li, M2, O and X" means that the molar ratio of the total of the amounts of substance of Li, M2, O and X relative to the total of the amounts of substance of all the elements constituting the second solid electrolyte 100 is greater than or equal to 90%. As an example, the molar ratio may be greater than or equal to 95%.

To further enhance the lithium ion conductivity, the second solid electrolyte 100 may consist solely of Li, M2, O and X.

In the second solid electrolyte 100, X may be one selected from the group consisting of Cl, Br and I.

The second solid electrolyte 100 may include a crystal phase giving rise to a peak at a diffraction angle 2θ in the range of greater than or equal to 11.05° and less than or equal to 13.86° in an X-ray diffraction pattern obtained by X-ray diffractometry using Cu-Kα radiation. Here, the "peak" means a diffraction peak in an X-ray diffraction pattern.

The above configuration ensures that paths for the diffusion of lithium ions are easily formed and thus the second solid electrolyte 100 attains high lithium ion conductivity.

The X-ray diffraction pattern of the solid electrolyte according to the embodiment 1 may be obtained by θ-2θ X-ray diffractometry using Cu-Kα radiation (wavelengths of 1.5405 Å and 1.5444 Å, that is, wavelengths of 0.15405 nm and 0.15444 nm).

To further enhance the ion conductivity, the second solid electrolyte 100 may further include an additional crystal phase different from the crystal phase having a peak in the above range of diffraction angles 2θ. That is, the second solid electrolyte 100 may further include an additional crystal phase that shows a peak in a different range of diffraction angles 2θ from the crystal phase having a peak in the above range of diffraction angles 2θ in the X-ray diffraction pattern. The additional crystal phase may be interposed between the crystal phases having a peak in the above range of diffraction angles 2θ.

In the second solid electrolyte 100, the Li to M2 molar ratio Li/M2 may be greater than or equal to 0.60 and less than or equal to 2.4. The O to X molar ratio O/X may be greater than or equal to 0.16 and less than or equal to 0.35.

The second solid electrolyte 100 satisfying the above configuration can attain higher lithium ion conductivity. Specifically, the concentration of Li as a conduction carrier can be optimized when the molar ratio Li/M2 is in the above range. When the molar ratio O/X is in the above range, the crystal phase having high ion conductivity is formed easily. Thus, the lithium ion conductivity is further enhanced.

In the second solid electrolyte 100, the Li to M2 molar ratio Li/M2 may be greater than or equal to 0.96 and less than or equal to 1.20.

The above configuration ensures that the crystal phase having high ion conductivity is formed more easily and the second solid electrolyte 100 attains higher lithium ion conductivity.

The second solid electrolyte 100 may be free from Y (yttrium). Furthermore, the second solid electrolyte may be free from sulfur.

(Positive Electrode Active Material)

The positive electrode active material 110 includes a material that is capable of occluding and releasing metal ions (for example, lithium ions). Examples of the positive electrode active materials 110 that may be used include transition metal oxides, transition metal fluorides, polyanionic materials, fluorinated polyanionic materials, transition metal sulfides, transition metal oxysulfides transition metal oxynitrides, and lithium-containing compounds thereof. Examples of the lithium-containing transition metal oxides include $Li(NiCoAL)O_2$, $Li(NiCoMn)O_2$ and $LiCoO_2$. In particular, the use of the lithium-containing transition metal oxide as the positive electrode active material 110 can reduce the manufacturing costs and can offer a higher average discharge voltage.

The positive electrode active material 110 may contain Ni, Co and Mn. The positive electrode active material 110 may include lithium nickel cobalt manganese oxide. For example, the positive electrode active material 110 may include $Li(NiCoMn)O_2$.

The above configuration can offer further enhancements in energy density and charge/discharge efficiency of a battery.

The shape of the second solid electrolyte 100 is not particularly limited. When the second solid electrolyte 100 is a powder, the shape thereof may be, for example, acicular, spherical, elliptical spherical or other shape. For example, the shape of the second solid electrolyte 100 may be particulate.

When, for example, the shape of the second solid electrolyte 100 is particulate (for example, spherical), the median diameter may be less than or equal to 100 μm. When the median diameter is less than or equal to 100 μm, the coated active material 130 and the second solid electrolyte 100 may be favorably dispersed in the positive electrode material 1000. Thus, the charge/discharge characteristics of a battery are enhanced. In the embodiment 1, the median diameter of the second solid electrolyte 100 may be less than or equal to 10 μm.

The above configuration ensures that the coated active material 130 and the second solid electrolyte 100 can be favorably dispersed in the positive electrode material 1000.

In the embodiment 1, the median diameter of the second solid electrolyte 100 may be smaller than the median diameter of the coated active material 130.

The above configuration ensures that the second solid electrolyte 100 and the coated active material 130 can be more favorably dispersed in the positive electrode material 1000.

The median diameter of the coated active material 130 may be greater than or equal to 0.1 μm and less than or equal to 100 μm.

When the median diameter of the coated active material 130 is greater than or equal to 0.1 μm, the coated active material 130 and the second solid electrolyte 100 may be favorably dispersed in the positive electrode material 1000. As a result, the charge/discharge characteristics of a battery are enhanced.

When the median diameter of the coated active material 130 is less than or equal to 100 μm, a sufficient rate of diffusion of lithium in the coated active material 130 is ensured to allow a battery to be operated at a high output.

The median diameter of the coated active material 130 may be larger than the median diameter of the second solid electrolyte 100. In this case, the coated active material 130 and the second solid electrolyte 100 can be favorably dispersed.

Here, the median diameter means the particle size at 50% cumulative volume in the volume-based grain size distribution. The volume-based grain size distribution is measured with, for example, a laser diffraction measurement device or an image analyzer.

At least part of the surface of the coating layer 111 may be covered with a dissimilar coating material.

The dissimilar coating material may include a Li—Nb—O compound such as $LiNbO_3$, a Li—B—O compound such as $LiBO_2$ or $Li_3BO_3$, a Li—Al—O compound such as $LiAlO_2$, a Li—Si—O compound such as $Li_4SiO_4$, $Li_2SO_4$, a Li—Ti—O compound such as $Li_4TisO_2$, a Li—Zr—O compound such as $Li_2ZrO_3$, a Li—Mo—O compound such as $Li_2MoO_3$, a Li—V—O compound such as $LiV_2O_5$, a Li—W—O compound such as $Li_2WO_4$, or a Li—P—O compound such as $Li_3PO_4$.

The above configuration can suppress the oxidation of the first solid electrolyte in the coating layer 111 at the positive electrode.

As illustrated in FIG. 1, the second solid electrolyte 100 and the coated active material 130 may be in contact with each other. In this case, the coating layer 111 and the positive electrode active material 110 are in contact with each other.

The positive electrode material may include a plurality of particles of the second solid electrolyte 100 and a plurality of particles of the coated active material 130.

The content of the second solid electrolyte 100 and the content of the coated active material 130 may be the same as or different from each other.

The above configuration can suppress an increase in internal resistance of a battery during charging.

<Methods for Producing the First Solid Electrolyte and the Second Solid Electrolyte>

For example, the first solid electrolyte contained in the coating layer 111, and the second solid electrolyte 100 may be produced by the following method.

Ingredient powders of binary halides are provided in a blending ratio that will give the target composition, and the powders are mixed with one another. When, for example, $Li_{2.6}Ti_{0.4}Al_{0.6}F_6$ is the target product, LiF, $TiF_4$ and $AlF_3$ are provided in a molar ratio of about 2.6:0.4:0.6. The blending ratio may be adjusted beforehand in consideration of the change in composition during the synthesis process so as to cancel the change.

After being mixed together sufficiently, the ingredient powders are mixed, crushed and reacted using a mechanochemical milling method.

After being mixed together sufficiently, the ingredient powders may be heat-treated in vacuum or in an inert atmosphere. For example, the heat treatment is preferably performed under heat treatment conditions of 100° C. to 300° C. for 1 or more hours. To suppress the change in composition during the heat treatment process, the ingredient powders are preferably heat-treated under sealed conditions in a hermetic container such as a quartz tube.

The first solid electrolyte and the second solid electrolyte 100 may be obtained in the manner described above.

For example, the composition of the solid electrolyte may be determined by ICP emission spectroscopy or ion chromatography.

The location of the X-ray diffraction peak of the solid electrolyte, that is, the structure of the crystal phase may be controlled to the target by selecting the ingredient powders, controlling the mixing ratio of the ingredient powders, and adopting an appropriate method and appropriate conditions for performing the reaction of the ingredient powders.

<Methods for Producing the Coated Active Material>

For example, the coated active material 130 may be produced by the following method.

A powder of the positive electrode active material 110 and a powder of the first solid electrolyte are provided in a predetermined mass ratio. For example, a powder of $Li(NiCoMn)O_2$ is provided as the positive electrode active material 110, and a powder of $Li_{2.7}Ti_{0.3}Al_{0.7}F_6$ as the first solid electrolyte. These two materials are added into the same reaction vessel, and a shear force is applied to the two materials by using a rotating blade. Alternatively, the two materials may be caused to collide with each other by a jet stream. The application of mechanical energy allows the first solid electrolyte to cover at least part of the surface of the positive electrode active material.

The mixture of the powder of the positive electrode active material 110 and the powder of the first solid electrolyte may be milled before the mixture is subjected to the mechanical energy. A mixing device such as a ball mill may be used to perform the milling treatment. To prevent the materials from oxidation, the milling treatment may be performed in a dry and inert atmosphere.

The coated active material 130 may also be produced by a dry composite particle production process. The dry composite particle production process includes applying at least one type of mechanical energy selected from the group consisting of impact, compression and shearing to the positive electrode active material 110 and the first solid electrolyte. The positive electrode active material 110 and the first solid electrolyte are mixed together in an appropriate ratio.

The device used in the method for producing the coated active material 130 is not particularly limited and may be any device that can apply mechanical energy such as impact, compression or shearing to the mixture of the positive electrode active material 110 and the first solid electrolyte. Examples of the devices capable of mechanical energy application include compression shearing processing devices (composite particle production devices) such as ball mills, jet mills, "Mechano Fusion" (manufactured by Hosokawa Micron Corporation) and "Nobilta" (manufactured by Hosokawa Micron Corporation), and "Hybridization System (high-speed airflow impact device)" (manufactured by Nara Machinery Co., Ltd.).

"Mechano Fusion" is a composite particle production device based on the dry mechanical composite technique that applies strong mechanical energy to a plurality of different ingredient particles. Mechano Fusion produces composite particles by applying mechanical energy such as compression, shearing and friction to the ingredient powders supplied between the rotating container and the press head.

"Nobilta" is a composite particle production device that produces composite particles from nanoparticles as ingredients by utilizing the dry mechanical composite technique developed from the composite particle technique. To produce composite particles, Nobilta applies mechanical energy such as impact, compression or shearing to a plurality of ingredient powders.

In "Nobilta", a rotor is arranged in a horizontal cylindrical mixing container with a predetermined gap from the inner wall of the mixing container. The rotor is rotated at a high speed and forcibly causes the ingredient powders to pass through the gap repeatedly. In this manner, the impact, compressive and shear forces are allowed to act on the mixture to produce composite particles of the positive electrode active material 110 and the first solid electrolyte.

Conditions such as the rotor rotational speed, the processing time, and the amounts of ingredients may be controlled appropriately.

In "Hybridization System", a force, mainly impact, is allowed to act on the ingredient powders while the ingredient powders are dispersed in a high-speed airflow. In this manner, the positive electrode active material 110 and the first solid electrolyte are formed into composite particles.

<Methods for Producing the Positive Electrode Material>

The positive electrode material 1000 may be obtained by mixing the coated active material 130 and the second solid electrolyte 100 with each other. The coated active material 130 and the second solid electrolyte 100 may be mixed together by any method without limitation. For example, the coated active material 130 and the second solid electrolyte 100 may be mixed together using a tool such as a mortar, or the coated active material 130 and the second solid electrolyte 100 may be mixed together with a mixing device such as a ball mill. The mixing ratio of the coated active material 130 to the second solid electrolyte 100 is not particularly limited.

Embodiment 2

Hereinbelow, the embodiment 2 will be described. Overlaps with the description of the embodiment 1 will be omitted appropriately.

Figure 2:
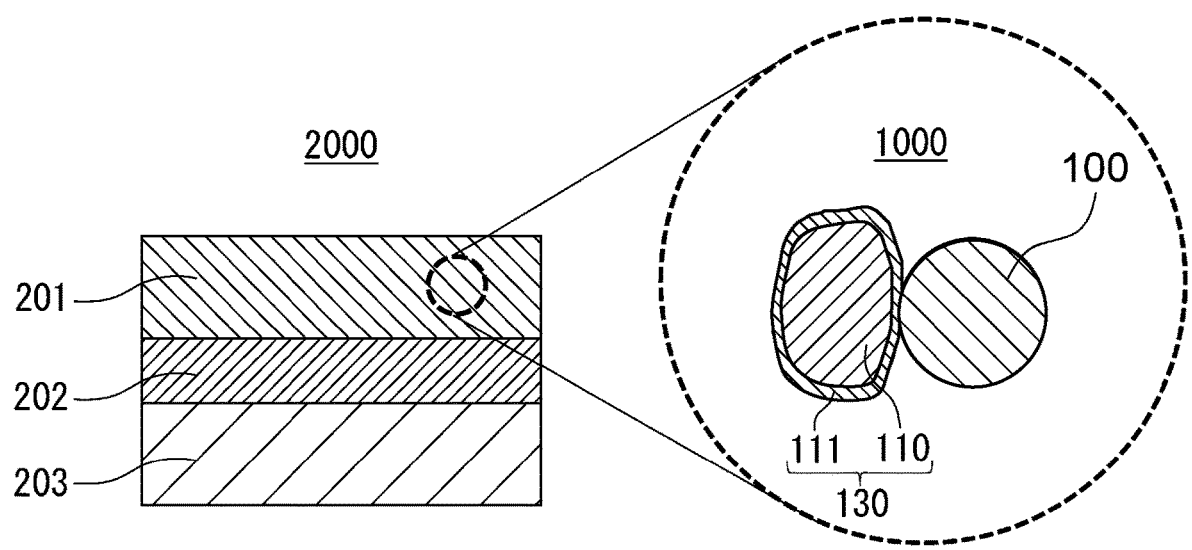
FIG. 2 is a sectional view illustrating a schematic configuration of a battery according to embodiment 2.

FIG. 2 is a sectional view illustrating a schematic configuration of a battery 2000 according to the embodiment 2.

The battery 2000 in the embodiment 2 includes a positive electrode 201, an electrolyte layer 202 and a negative electrode 203.

The positive electrode 201 includes the positive electrode material 1000 in the embodiment 1.

The electrolyte layer 202 is arranged between the positive electrode 201 and the negative electrode 203.

With the above configuration, the battery 2000 attains no or a small increase in internal resistance during charging.

The volume ratio "v1:100−v1" between the positive electrode material 1000 and the second solid electrolyte 100 present in the positive electrode 201 may satisfy 30≤v1≤98. Here, v1 indicates the volume proportion of the positive electrode material 1000 relative to the total volume of the positive electrode material 1000 and the second solid electrolyte 100 present in the positive electrode 201 taken as 100. When 30≤v1 is satisfied, the battery may attain a sufficient energy density. When v1≤98 is satisfied, the battery 2000 may be operated at a high output more easily.

The thickness of the positive electrode 201 may be greater than or equal to 10 μm and less than or equal to 500 μm. The positive electrode 201 having a thickness of greater than or equal to 10 μm ensures a sufficient energy density of the battery 2000. When the thickness of the positive electrode 201 is less than or equal to 500 μm, the battery may be operated at a high output.

The electrolyte layer 202 is a layer including an electrolyte. For example, the electrolyte is a solid electrolyte. The solid electrolyte contained in the electrolyte layer 202 is written as the third solid electrolyte. That is, the electrolyte layer 202 may include a third solid electrolyte.

The third solid electrolyte may be a halide solid electrolyte. The third solid electrolyte that is used may be a solid electrolyte having an identical composition to the first solid electrolyte in the embodiment 1 or may be a solid electrolyte having an identical composition to the second solid electrolyte or including an identical crystal phase to the second solid electrolyte. That is, the electrolyte layer 202 may include a solid electrolyte having an identical composition to the first solid electrolyte in the embodiment 1 or may include a solid electrolyte having an identical composition to the second solid electrolyte or including an identical crystal phase to the second solid electrolyte.

The third solid electrolyte may be a solid electrolyte having an identical composition to the first solid electrolyte in the embodiment 1. That is, the electrolyte layer 202 may include a solid electrolyte having an identical composition to the first solid electrolyte in the embodiment 1.

The above configuration ensures that the battery attains further enhancements in output density and charge/discharge characteristics.

The third solid electrolyte may be a halide solid electrolyte having a different composition from the first solid electrolyte, or may be a halide solid electrolyte having a different composition from the second solid electrolyte or including a different crystal phase from the second solid electrolyte. That is, the electrolyte layer 202 may include a halide solid electrolyte having a different composition from the first solid electrolyte, or may include a halide solid electrolyte having a different composition from the second solid electrolyte or including a different crystal phase from the second solid electrolyte.

The third solid electrolyte may be a sulfide solid electrolyte, an oxide solid electrolyte, a polymer solid electrolyte or a complex hydride solid electrolyte.

The third solid electrolyte may be a sulfide solid electrolyte. For example, the sulfide solid electrolyte that is used may be $Li_2S—P_2S_5$, $Li_2S—SiS_2$, $Li_2S—B_2S_3$, $Li_2S—GeS_2$, $Li_{3.25}Ge_{0.25}P_{0.75}S_4$ or $Li_{10}GeP_2S_{12}$. For example, LiX, $Li_2O$, $MO_q$ or $Li_pMO_q$ may be added to the above sulfide solid electrolytes. The element X in "LiX" is at least one element selected from the group consisting of F, Cl, Br and I. The element M in "$MO_q$" and in "$Li_pMO_q$" is at least one element selected from the group consisting of P, Si, Ge, B, Al, Ga, In, Fe and Zn. The subscripts p and q in "$MO_q$" and "$Li_pMO_q$" are each independently a natural number.

According to the above configuration, the electrolyte layer 202 includes a sulfide solid electrolyte that has excellent reduction stability, and thus a low-potential material such as graphite or metallic lithium can be used as the negative electrode material. Thus, the battery 2000 attains an enhancement in energy density.

The third solid electrolyte may be an oxide solid electrolyte. Examples of the oxide solid electrolytes that may be used include NASICON-type solid electrolytes represented by $LiTi_2(PO_4)_3$ and element-substituted derivatives thereof, Perovskite-type solid electrolytes such as $(LaLi)TiO_3$ system, LISICON-type solid electrolytes represented by $Li_{14}ZnGe_4O_{16}$, $Li_4SiO_4$, $LiGeO_4$ and element-substituted derivatives thereof, garnet-type solid electrolytes represented by $Li_7La_3Zr_2O_{12}$ and element-substituted derivatives thereof, $Li_3N$ and H-substituted derivatives thereof, $Li_3PO_4$ and N-substituted derivatives thereof, and glass or glass ceramic electrolytes based on a Li—B—O compound such as $LiBO_2$ or $Li_3BO_3$ and containing such a material as $Li_2SO_4$ or $Li_2CO_3$.

The third solid electrolyte may be a polymer solid electrolyte. Examples of the polymer solid electrolytes that may be used include compounds formed between a polymer compound and a lithium salt. The polymer compound may have an ethylene oxide structure. By having an ethylene oxide structure, the polymer compound can contain a large amount of the lithium salt and thus can offer higher ion conductivity. Examples of the lithium salts that may be used include $LiPF_6$, $LiBF_4$, $LiSbF_6$, $LiAsF_6$, $LiSO_3CF_3$, LiN $(SO_2CF_3)_2$, $LiN(SO_2C_2F_5)_2$, $LiN(SO_2CF_3)(SO_2C_4F_9)$ and $LiC(SO_2CF_3)_3$. The lithium salt that is used may be a single kind of lithium salt selected from those described above, or may be a mixture of two or more kinds of lithium salts selected from those described above.

The third solid electrolyte may be a complex hydride solid electrolyte. Examples of the complex hydride solid electrolytes that may be used include $LiBH_4$—$LiI$ and $LiBH_4$—$P_2Si$.

The electrolyte layer 202 may include the third solid electrolyte as a main component. That is, the electrolyte layer 202 may include the third solid electrolyte in a mass ratio of, for example, greater than or equal to 50% (that is, greater than or equal to 50 mass %) relative to the whole of the electrolyte layer 202.

The above configuration ensures that the battery 2000 attains further enhancements in charge/discharge characteristics.

The electrolyte layer 202 may include the third solid electrolyte in a mass ratio of greater than or equal to 70% (that is, greater than or equal to 70 mass %) relative to the whole of the electrolyte layer 202.

The above configuration ensures that the battery 2000 attains further enhancements in charge/discharge characteristics.

The electrolyte layer 202 may include the third solid electrolyte as a main component and may further include inevitable impurities, or impurities such as starting materials, byproducts and decomposition products used or occurring in the synthesis of the third solid electrolyte.

For example, the electrolyte layer 202 may include the third solid electrolyte in a mass ratio of 100% (that is, 100 mass %) relative to the whole of the electrolyte layer 202 except inevitable impurities.

The above configuration ensures that the battery 2000 attains further enhancements in charge/discharge characteristics.

As described above, the electrolyte layer 202 may be composed solely of the third solid electrolyte.

The electrolyte layer 202 may include two or more kinds of materials described above as the third solid electrolytes. For example, the electrolyte layer 202 may include a halide solid electrolyte and a sulfide solid electrolyte.

The thickness of the electrolyte layer 202 may be greater than or equal to 1 μm and less than or equal to 300 μm. When the thickness of the electrolyte layer 202 is greater than or equal to 1 μm, a short-circuit is unlikely to occur between the positive electrode 201 and the negative electrode 203. When the thickness of the electrolyte layer 202 is less than or equal to 300 μm, the battery 2000 may be operated at a high output.

The negative electrode 203 includes a material that is capable of occluding and releasing metal ions (for example, lithium ions). For example, the negative electrode 203 includes a negative electrode active material.

Examples of the negative electrode active materials that may be used include metal materials, carbon materials, oxides, nitrides, tin compounds and silicon compounds. The metal materials may be elemental metals. Alternatively, the metal materials may be alloys. Examples of the metal materials include lithium metal and lithium alloys. Examples of the carbon materials include natural graphite, coke, semi-graphitized carbon, carbon fibers, spherical carbon, artificial graphite and amorphous carbon. From the point of view of capacity density, silicon (Si), tin (Sn), silicon compounds and tin compounds may be used.

The negative electrode 203 may include a solid electrolyte. The solid electrolyte used here may be the solid electrolyte described as an exemplary material for forming the electrolyte layer 202. This configuration enhances the lithium ion conductivity inside the negative electrode 203 and allows the battery 2000 to be operated at a high output.

The median diameter of particles of the negative electrode active material may be greater than or equal to 0.1 μm and less than or equal to 100 μm. When the median diameter of the particles of the negative electrode active material is greater than or equal to 0.1 μm, the negative electrode active material and the solid electrolyte may be favorably dispersed in the negative electrode. Thus, the battery 2000 attains enhancements in charge/discharge characteristics. When the median diameter of the particles of the negative electrode active material is less than or equal to 100 μm, lithium can be diffused quickly in the negative electrode active material. Thus, the battery 2000 may be operated at a high output.

The median diameter of the particles of the negative electrode active material may be larger than the median diameter of the particles of the solid electrolyte present in the negative electrode 203. In this case, the particles of the negative electrode active material and the particles of the solid electrolyte can be favorably dispersed.

The volume ratio "v2:100–v2" between the negative electrode active material and the solid electrolyte present in the negative electrode 203 may satisfy $30 \leq v2 \leq 95$. Here, v2 indicates the volume proportion of the negative electrode active material particles relative to the total volume of the negative electrode active material particles and the solid electrolyte present in the negative electrode 203 taken as 100. When $30 \leq v2$, the battery 2000 may attain a sufficient energy density. When $v2 \leq 95$, the battery 2000 may be operated at a high output.

The thickness of the negative electrode 203 may be greater than or equal to 10 μm and less than or equal to 500 μm. The negative electrode 203 having a thickness of greater than or equal to 10 μm may ensure a sufficient energy density of the battery 2000. When the thickness of the negative electrode 203 is less than or equal to 500 μm, the battery 2000 may be operated at a high output.

At least one of the positive electrode 201, the electrolyte layer 202 or the negative electrode 203 may include a binder for the purpose of enhancing the adhesion between the particles. Binders are used to enhance binding properties of a material forming an electrode. Examples of the binders include polyvinylidene fluoride, polytetrafluoroethylene, polyethylene, polypropylene, aramid resins, polyamides, polyimides, polyamideimides, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyethers, polyether sulfones, hexafluoropolypropylene, styrene butadiene rubbers and carboxymethylcellulose. Examples of the binders that may be used further include copolymers of two or more materials selected from the group consisting of tetrafluoroethylene, hexafluoroethylene, hexafluoropropylene, perfluoroalkyl vinyl ethers, vinylidene fluoride, chlorotrifluoroethylene, ethylene, propylene, pentafluoropropylene, fluoromethyl vinyl ether, acrylic acid and hexadiene. Furthermore, a mixture of two or more materials selected from the above may be used.

At least one of the positive electrode 201 or the negative electrode 203 may include a conductive auxiliary for the purpose of enhancing electron conductivity. Examples of the conductive auxiliaries that may be used include graphites such as natural graphite and artificial graphite, carbon blacks such as acetylene black and Ketjen black, conductive fibers such as carbon fibers and metal fibers, fluorocarbons, metal powders such as aluminum, conductive whiskers such as zinc oxide and potassium titanate, conductive metal oxides such as titanium oxide, and conductive polymer compounds such as polyaniline, polypyrrole and polythiophene. The use of a carbon conductive auxiliary as the conductive auxiliary allows for cost reduction.

The batteries in the embodiment 2 may be formed into various shapes such as, for example, coin, cylindrical, prismatic, sheet, button, flat and laminate.

EXAMPLES

Hereinbelow, the present disclosure will be described in detail based on Examples and Comparative Example.

Example 1

[Preparation of First Solid Electrolyte]

In an argon atmosphere having a dew point of less than or equal to −60° C., LiF, $TiF_4$ and $AlF_3$ as ingredient powders were weighed in a molar ratio of $LiF:TiF_4:AlF_3=2.6:0.4:0.6$. Subsequently, the mixture obtained was milled with a planetary ball mill (P-7, manufactured by Fritsch Japan Co., Ltd.) under conditions of 500 rpm for 12 hours. Thus, a powder of a first solid electrolyte of Example 1 represented by the compositional formula of $Li_{2.6}Ti_{0.4}Al_{0.6}F_6$ was obtained. The composition of the first solid electrolyte of Example 1 is described in Table 1.

[Preparation of Second Solid Electrolyte]

In an argon atmosphere having a dew point of less than or equal to −60° C., $Li_2O_2$ and $TaCl_5$ as ingredient powders were weighed in a molar ratio of $Li_2O_2:TaCl_5=1:2$. Subsequently, the mixture obtained was milled with a planetary ball mill (P-7, manufactured by Fritsch Japan Co., Ltd.) under conditions of 600 rpm for 12 hours. Furthermore, treatment was performed at 200° C. for 3 hours. Thus, a powder of a second solid electrolyte of Example 1 composed of Li, Ta, O and Cl was obtained. The elements constituting the second solid electrolyte of Example 1 are described in Table 1.

In a dry environment having a dew point of less than or equal to −50° C., the second solid electrolyte of Example 1 was analyzed by the θ-2θ method with an X-ray diffractometer (MiniFlex 600, Rigaku Corporation) to measure an X-ray diffraction pattern. Cu-Kα radiation (wavelengths 1.5405 Å and 1.5444 Å) was used as an X-ray source.

Figure 3:
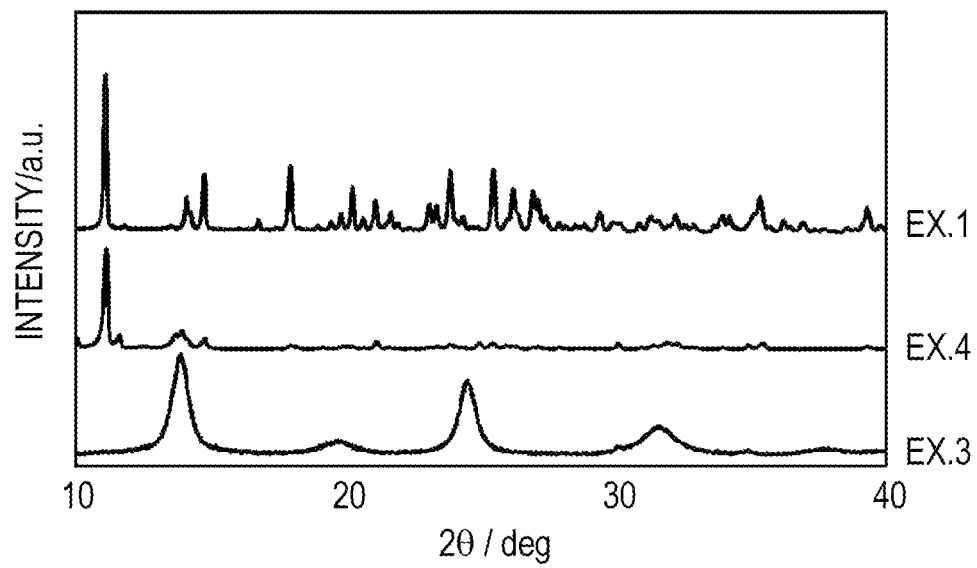
FIG. 3 is a graph illustrating X-ray diffraction patterns of second solid electrolytes of Examples 1, 3 and 4.
Figure 4A:
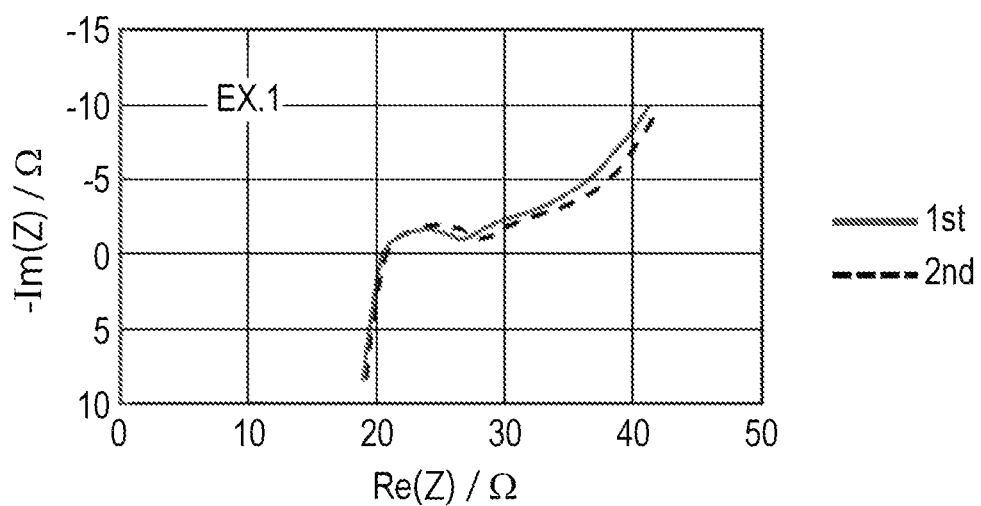
FIG. 4A is a view illustrating a Nyquist diagram of a battery of Example 1 at 4.3 V.
Figure 4B:
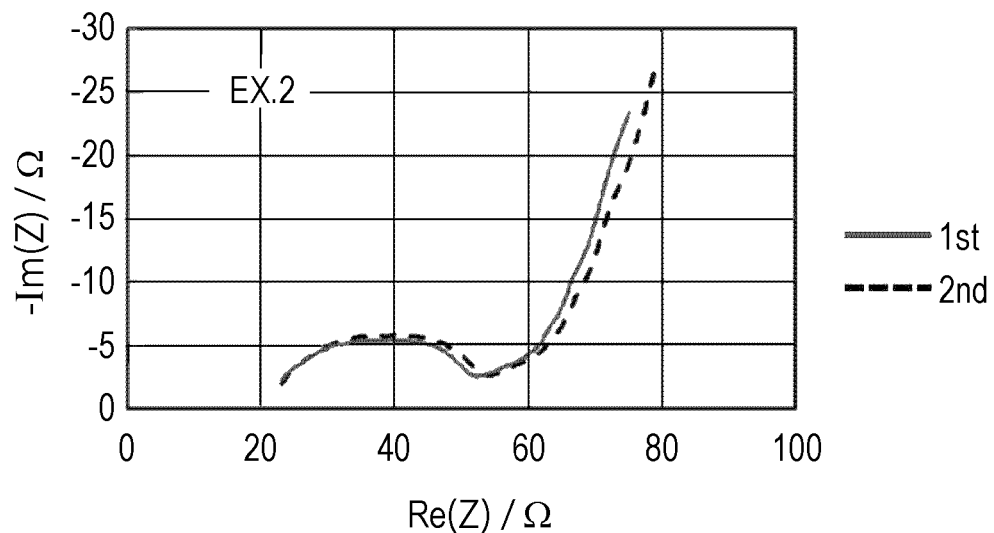
FIG. 4B is a view illustrating a Nyquist diagram of a battery of Example 2 at 4.3 V.
Figure 4C:
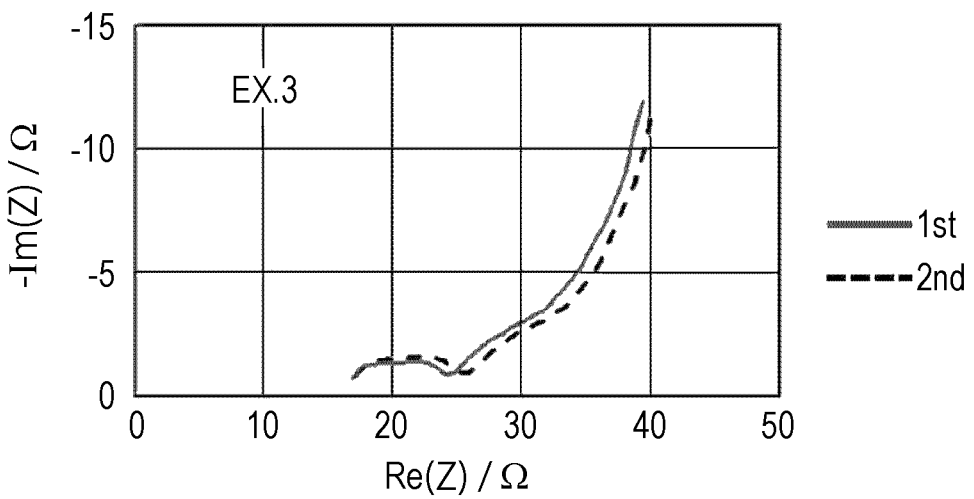
FIG. 4C is a view illustrating a Nyquist diagram of a battery of Example 3 at 4.3 V.
Figure 4D:
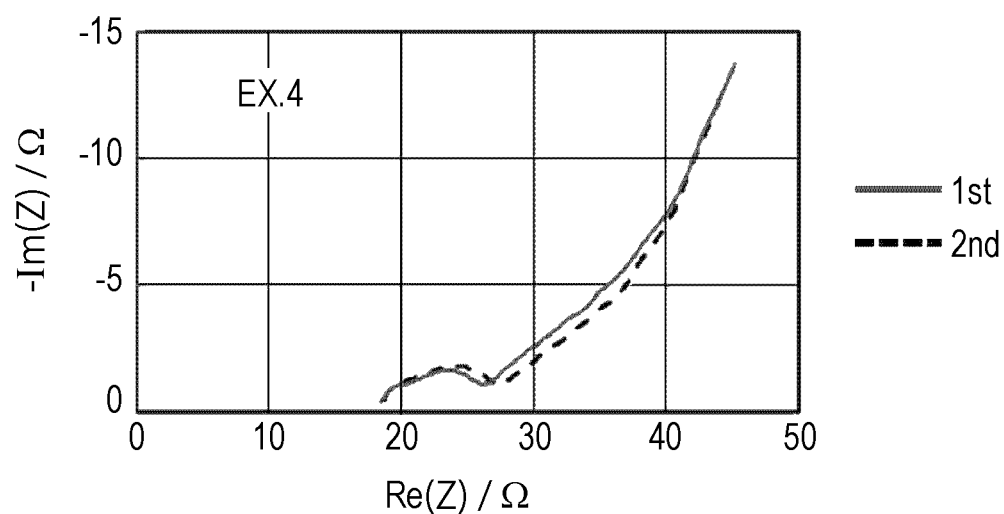
FIG. 4D is a view illustrating a Nyquist diagram of a battery of Example 4 at 4.3 V.
Figure 4E:
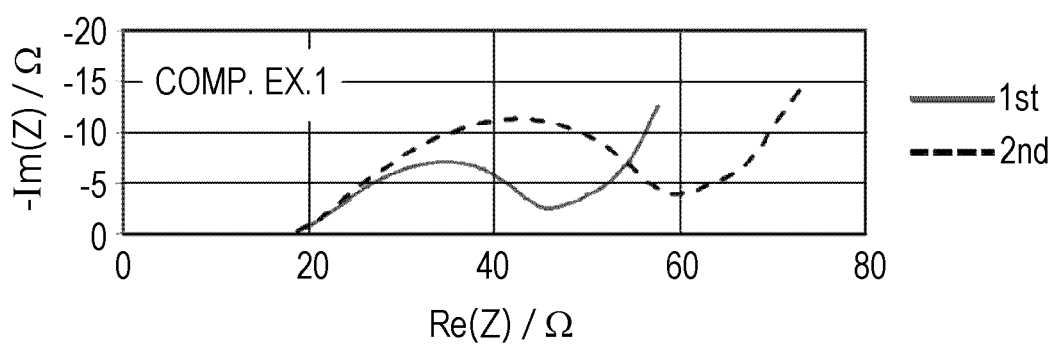
FIG. 4E is a view illustrating a Nyquist diagram of a battery of Comparative Example 1 at 4.3 V.

FIG. 3 is a graph illustrating the X-ray diffraction pattern of the second solid electrolyte of Example 1. As illustrated in FIG. 3, the crystal phases contained in the second solid electrolyte of Example 1 had a peak at a diffraction angle 2θ in the range of greater than or equal to 11.050 and less than or equal to 13.86° in the X-ray diffraction pattern obtained by X-ray diffractometry using Cu-Kα radiation.

In the second solid electrolyte of Example 1, the Li to Ta molar ratio Li/Ta was 1.0 (based on the amounts added). The O to Cl molar ratio O/Cl was 0.2 (based on the amounts added).

[Preparation of Coated Active Material]

In an argon atmosphere having a dew point of less than or equal to −60° C., $Li(NiCoMn)O_2$ (hereinafter, written as NCM) as a positive electrode active material, and the first solid electrolyte of Example 1 were weighed in a mass ratio of 100:3. These materials were added to dry composite particle production device Nobilta (manufactured by Hosokawa Micron Corporation) and were treated at 6000 rpm for 30 minutes to produce composite particles in which the first solid electrolyte formed a coating layer on the surface of the particles of the positive electrode active material. A coated active material of Example 1 was thus obtained.

[Preparation of Positive Electrode Material]

In an argon atmosphere having a dew point of less than or equal to −60° C., the coated active material of Example 1 and the second solid electrolyte were weighed in a mass ratio of 77.09:22.91. These materials were mixed with each other in a mortar. A positive electrode material of Example 1 was thus prepared.

Example 2

[Preparation of First Solid Electrolyte]

In an argon atmosphere having a dew point of less than or equal to −60° C., LiF and $ZrF_4$ as ingredient powders were weighed in a molar ratio of $LiF:ZrF_4=2:1$.

Subsequently, the mixture obtained was milled with a planetary ball mill (P-7, manufactured by Fritsch Japan Co., Ltd.) under conditions of 500 rpm for 12 hours. Thus, a powder of a first solid electrolyte of Example 2 represented by the compositional formula of $Li_2ZrF_6$ was obtained. The composition of the first solid electrolyte of Example 2 is described in Table 1.

[Preparation of Second Solid Electrolyte]

In an argon atmosphere having a dew point of less than or equal to −60° C., $Li_2O_2$ and $TaCl_5$ as ingredient powders were weighed in a molar ratio of $Li_2O_2:TaCl_5=1:2$. Subsequently, the mixture obtained was milled with a planetary ball mill (P-7, manufactured by Fritsch Japan Co., Ltd.) under conditions of 600 rpm for 12 hours. Furthermore, treatment was performed at 200° C. for 3 hours. Thus, a powder of a second solid electrolyte of Example 2 composed of Li, Ta, O and Cl was obtained. The elements constituting the second solid electrolyte of Example 2 are described in Table 1.

An X-ray diffraction pattern of the second solid electrolyte of Example 2 was measured in the same manner as in Example 1. The crystal phases contained in the second solid electrolyte of Example 2 had a peak at a diffraction angle 2θ in the range of greater than or equal to 11.05° and less than or equal to 13.86° in the X-ray diffraction pattern obtained by X-ray diffractometry using Cu-Kα radiation.

In the second solid electrolyte of Example 2, the Li to Ta molar ratio Li/Ta was 1.0 (based on the amounts added). The O to Cl molar ratio O/Cl was 0.2 (based on the amounts added).

[Preparation of Coated Active Material]

In an argon atmosphere having a dew point of less than or equal to −60° C., NCM as a positive electrode active material, and the first solid electrolyte of Example 2 were weighed in a mass ratio of 100:3. These materials were added to dry composite particle production device Nobilta (manufactured by Hosokawa Micron Corporation) and were treated at 6000 rpm for 30 minutes to produce composite particles in which the first solid electrolyte formed a coating layer on the surface of the particles of the positive electrode active material. A coated active material of Example 2 was thus obtained.

[Preparation of Positive Electrode Material]

In an argon atmosphere having a dew point of less than or equal to −60° C., the coated active material of Example 2 and the second solid electrolyte were weighed in a mass ratio of 72.81:27.19. These materials were mixed with each other in a mortar. A positive electrode material of Example 2 was thus prepared.

Example 3

[Preparation of First Solid Electrolyte]

In an argon atmosphere having a dew point of less than or equal to −60° C., LiF, TiF$_4$ and AlF$_3$ as ingredient powders were weighed in a molar ratio of LiF:TiF$_4$:AlF$_3$=2.6:0.4:0.6. Subsequently, the mixture obtained was milled with a planetary ball mill (P-7, manufactured by Fritsch Japan Co., Ltd.) under conditions of 500 rpm for 12 hours. Thus, a powder of a first solid electrolyte of Example 3 represented by the compositional formula of Li$_{2.6}$Ti$_{0.4}$Al$_{0.6}$F$_6$ was obtained. The composition of the first solid electrolyte of Example 3 is described in Table 1.

[Preparation of Second Solid Electrolyte]

In an argon atmosphere having a dew point of less than or equal to −60° C., Li$_2$O$_2$ and NbCl$_5$ as ingredient powders were weighed in a molar ratio of Li$_2$O$_2$:NbCl$_5$=1:2. Subsequently, the mixture obtained was milled with a planetary ball mill (P-7, manufactured by Fritsch Japan Co., Ltd.) under conditions of 600 rpm for 12 hours. Furthermore, treatment was performed at 80° C. for 3 hours. Thus, a powder of a second solid electrolyte of Example 3 composed of Li, Nb, O and Cl was obtained. The elements constituting the second solid electrolyte of Example 3 are described in Table 1.

An X-ray diffraction pattern of the second solid electrolyte of Example 3 was measured in the same manner as in Example 1. As illustrated in FIG. 3, the crystal phases contained in the second solid electrolyte of Example 3 had a peak at a diffraction angle 2θ in the range of greater than or equal to 11.050 and less than or equal to 13.86° in the X-ray diffraction pattern obtained by X-ray diffractometry using Cu-Kα radiation.

In the second solid electrolyte of Example 3, the Li to Nb molar ratio Li/Nb was 1.0 (based on the amounts added). The O to Cl molar ratio O/Cl was 0.2 (based on the amounts added).

[Preparation of Coated Active Material]

In an argon atmosphere having a dew point of less than or equal to −60° C., NCM as a positive electrode active material, and the first solid electrolyte of Example 3 were weighed in a mass ratio of 100:3. These materials were added to dry composite particle production device Nobilta (manufactured by Hosokawa Micron Corporation) and were treated at 6000 rpm for 30 minutes to produce composite particles in which the first solid electrolyte formed a coating layer on the surface of the particles of the positive electrode active material. A coated active material of Example 3 was thus obtained.

[Preparation of Positive Electrode Material]

In an argon atmosphere having a dew point of less than or equal to −60° C., the coated active material of Example 3 and the second solid electrolyte were weighed in a mass ratio of 82.04:17.96. These materials were mixed with each other in a mortar. A positive electrode material of Example 3 was thus prepared.

Example 4

[Preparation of First Solid Electrolyte]

In an argon atmosphere having a dew point of less than or equal to −60° C., LiF, TiF$_4$ and AlF$_3$ as ingredient powders were weighed in a molar ratio of LiF:TiF$_4$:AlF$_3$=2.6:0.4:0.6. Subsequently, the mixture obtained was milled with a planetary ball mill (P-7, manufactured by Fritsch Japan Co., Ltd.) under conditions of 500 rpm for 12 hours. Thus, a powder of a first solid electrolyte of Example 4 represented by the compositional formula of Li$_{2.6}$Ti$_{0.4}$Al$_{0.6}$F$_6$ was obtained. The composition of the first solid electrolyte of Example 4 is described in Table 1.

[Preparation of Second Solid Electrolyte]

In an argon atmosphere having a dew point of less than or equal to −60° C., Li$_2$O$_2$, TaCl$_5$ and NbCl$_6$ as ingredient powders were weighed in a molar ratio of Li$_2$O$_2$:TaCl$_5$:NbCl$_5$=1:1:1. Subsequently, the mixture obtained was milled with a planetary ball mill (P-7, manufactured by Fritsch Japan Co., Ltd.) under conditions of 600 rpm for 12 hours. Furthermore, treatment was performed at 200° C. for 3 hours. Thus, a powder of a second solid electrolyte of Example 4 composed of Li, Ta, Nb, O and Cl was obtained. The elements constituting the second solid electrolyte of Example 4 are described in Table 1.

An X-ray diffraction pattern of the second solid electrolyte of Example 4 was measured in the same manner as in Example 1. As illustrated in FIG. 3, the crystal phases contained in the second solid electrolyte of Example 4 had a peak at a diffraction angle 2θ in the range of greater than or equal to 11.050 and less than or equal to 13.86° in the X-ray diffraction pattern obtained by X-ray diffractometry using Cu-Kα radiation.

In the second solid electrolyte of Example 4, the molar ratio Li/(Ta+Nb) of Li to the total of Ta and Nb was 1.0 (based on the amounts added). The molar ratio O/Cl of O to Cl was 0.2 (based on the amounts added).

[Preparation of Coated Active Material]

In an argon atmosphere having a dew point of less than or equal to −60° C., NCM as a positive electrode active material, and the first solid electrolyte of Example 4 were weighed in a mass ratio of 100:3. These materials were added to dry composite particle production device Nobilta (manufactured by Hosokawa Micron Corporation) and were treated at 6000 rpm for 30 minutes to produce composite particles in which the first solid electrolyte formed a coating layer on the surface of the particles of the positive electrode active material. A coated active material of Example 4 was thus obtained.

[Preparation of Positive Electrode Material]

In an argon atmosphere having a dew point of less than or equal to −60° C., the coated active material of Example 4 and the second solid electrolyte were weighed in a mass ratio of 79.49:20.51. These materials were mixed with each other in a mortar. A positive electrode material of Example 4 was thus prepared.

Comparative Example 1

[Preparation of Positive Electrode Material]

NCM as a positive electrode active material, and the second solid electrolyte of Example 1 were weighed in a mass ratio of 77.09:22.91. These materials were mixed with each other in a mortar. A positive electrode material of Comparative Example 1 was thus prepared.

[Fabrication of Batteries]

Steps described below were performed using the positive electrode materials of Examples 1 to 4 and Comparative Example 1, glass ceramic Li$_2$S—P$_2$S$_5$ (hereinafter, written as LPS) as a sulfide solid electrolyte, and Li$_3$Y$_1$Br$_2$Cl$_4$ (hereinafter, written as LYBC) as a halide solid electrolyte.

First, a stack was formed in an insulating cylinder by adding LPS in an amount corresponding to a thickness of 550 μm (80 mg), LYBC in an amount corresponding to a thickness of 50 μm (20 mg), and the positive electrode material in this order. The mass of the positive electrode material was controlled so that the mass of the positive electrode active material contained therein would be 8.2 mg. The mass of the positive electrode material of Example 1 was 10.47 mg. The mass of the positive electrode material of Example 2 was 10.91 mg. The mass of the positive electrode material of Example 3 was 10.08 mg. The mass of the positive electrode material of Example 4 was 10.21 mg. The mass of the positive electrode material of Comparative Example 1 was 10.32 mg. Each of the stacks was pressed at a pressure of 360 MPa to form a positive electrode and a solid electrolyte layer.

Next, metallic Li was laminated with a thickness of 200 μm onto the side of the solid electrolyte layer opposite from the positive electrode. The resultant stack was pressed at a pressure of 80 MPa. A stack composed of the positive electrode, the solid electrolyte layer and the negative electrode was thus prepared.

Next, stainless steel current collectors were placed on and under the stack. Current collector leads were attached to the current collectors.

Lastly, the insulating cylinder was tightly closed with insulating ferrules to isolate the inside of the cylinder from the outer atmosphere.

Batteries of Examples 1 to 4 and Comparative Example 1 were thus fabricated.

[Charging Test]

The batteries of Examples 1 to 4 and Comparative Example 1 were subjected to a charging test under the following conditions.

The batteries were each placed in a thermostatic bath at 25° C.

The batteries were charged at a constant current corresponding to 0.05 C rate (20-hour rate) based on the theoretical capacity of the battery. The charge cutoff voltage was 4.3 V (vs. Li).

Next, the batteries were analyzed by the AC impedance method. The voltage amplitude was ±10 mV, and the frequencies were $10^7$ to $10^{-2}$ Hz. In the measurement, an electrochemical measurement system manufactured by Solartron was used. FIGS. 4A to 4E are views illustrating the Nyquist diagrams of the batteries of Examples 1 to 4 and Comparative Example 1, respectively, at 4.3 V. The abscissa and the ordinate in FIGS. 4A to 4E indicate the real part of the impedance and the imaginary part of the impedance, respectively. The waveforms of the semi-arcs drawn in the Nyquist diagram were assigned to the resistance component with the positive electrode and to the resistance component with metallic Li as the negative electrode, and were analyzed by curve fitting to calculate the interfacial resistance with the positive electrode in each of Examples 1 to 4 and Comparative Example 1.

Next, the batteries were discharged at a current value similarly corresponding to 0.05 C rate. The discharge cutoff voltage was 2.5 V (vs. Li).

The charging/discharging at 0.05 C rate was repeated twice, and the ratio of the increase in interfacial resistance with the positive electrode after the charging was calculated.

Table 1 describes the ratios of the increase in interfacial resistance with the positive electrode in Examples 1 to 4 and Comparative Example 1.

TABLE 1

| | First solid electrolyte | Elements constituting second solid electrolyte | Ratio of increase in interfacial resistance 2nd/1st |
| --- | --- | --- | --- |
| EX. 1 | $Li_{2.6}Ti_{0.4}Al_{0.6}F_6$ | Li—Ta—O—Cl | 0.8 |
| EX. 2 | $Li_2ZrF_6$ | Li—Ta—O—Cl | 1.0 |
| EX. 3 | $Li_{2.6}Ti_{0.4}Al_{0.6}F_6$ | Li—Nb—O—Cl | 0.9 |
| EX. 4 | $Li_{2.6}Ti_{0.4}Al_{0.6}F_6$ | Li—Ta—Nb—O—Cl | 0.9 |
| COMP. EX. 1 | — | Li—Ta—O—Cl | 1.4 |

<<Discussion>>

The results of Examples 1 to 4 and Comparative Example 1 described in Table 1 show that the interfacial resistance with the positive electrode increased after each cycle when the surface of the positive electrode active material was not covered with the coating layer of the F-containing halide solid electrolyte as the first solid electrolyte. The reason for this is probably because the Cl-containing halide solid electrolyte as the second solid electrolyte present in the positive electrode material was oxidatively decomposed along with the charging of the battery to give rise to an increase in interfacial resistance with the positive electrode. In contrast, the increase in internal resistance of the battery during charging was suppressed when the surface of the positive electrode active material was covered with the coating layer of the F-containing halide solid electrolyte as the first solid electrolyte.

As demonstrated in Examples above, the present disclosure makes it possible to suppress an increase in internal resistance of a battery during charging.

INDUSTRIAL APPLICABILITY

The battery of the present disclosure may be used as, for example, an all-solid-state lithium-ion secondary battery.

What is claimed is:

1. A positive electrode material comprising:
   a positive electrode active material;
   a coating layer covering at least part of a surface of the positive electrode active material, the coating layer including a first solid electrolyte; and
   a second solid electrolyte, wherein:
   the first solid electrolyte includes Li, M1 and F,
   M1 is at least one selected from the group consisting of Ti, Al and Zr,
   the second solid electrolyte includes Li, M2, O and X,
   M2 is at least one selected from the group consisting of Ta and Nb, and
   X is at least one selected from the group consisting of Cl, Br and I.

2. The positive electrode material according to claim 1, wherein
   the second solid electrolyte includes a crystal phase giving rise to a peak at a diffraction angle 2θ in the range of greater than or equal to 11.05° and less than or equal to 13.86° in an X-ray diffraction pattern obtained by X-ray diffractometry using Cu-Kα radiation.

3. The positive electrode material according to claim 1, wherein
   the second solid electrolyte has:
   a Li to M2 molar ratio Li/M2 of greater than or equal to 0.60 and less than or equal to 2.4; and
   an O to X molar ratio O/X of greater than or equal to 0.16 and less than or equal to 0.35.

4. The positive electrode material according to claim 1, wherein
the second solid electrolyte has:
a Li to M2 molar ratio Li/M2 of greater than or equal to 0.96 and less than or equal to 1.20.

5. The positive electrode material according to claim 1, wherein
M1 in the first solid electrolyte is at least one selected from the group consisting of Ti and Al.

6. The positive electrode material according to claim 5, wherein
the first solid electrolyte includes $Li_{2.6}Ti_{0.4}Al_{0.6}F_6$.

7. The positive electrode material according to claim 1, wherein
M1 in the first solid electrolyte is Zr.

8. The positive electrode material according to claim 7, wherein
the first solid electrolyte includes $Li_2ZrF_6$.

9. The positive electrode material according to claim 1, wherein
the positive electrode active material includes lithium nickel cobalt manganese oxide.

10. The positive electrode material according to claim 1, wherein the first solid electrolyte consists of Li, M1 and F.

11. The positive electrode material according to claim 1, wherein the second solid electrolyte consists of Li, M2, O and X.

12. The positive electrode material according to claim 1, wherein the first solid electrolyte consists of Li, M1 and F, and the second solid electrolyte consists of Li, M2, O and X.

13. The positive electrode material according to claim 1, wherein the second solid electrolyte consists essentially of Li, M2, O and X.

14. A positive electrode material comprising:
a positive electrode active material;
a coating layer covering at least part of a surface of the positive electrode active material, the coating layer including a first solid electrolyte; and
a second solid electrolyte, wherein:
the first solid electrolyte includes Li, M1 and F,
M1 is at least one selected from the group consisting of Ti, Al and Zr,
the second solid electrolyte includes Li, M2, O and X,
M2 is at least one selected from the group consisting of Ta and Nb, and
X is F and at least one selected from the group consisting of Cl, Br and I.

15. A battery comprising:
a positive electrode including the positive electrode material according to claim 1;
a negative electrode; and
an electrolyte layer disposed between the positive electrode and the negative electrode.

16. The battery according to claim 15, wherein
the electrolyte layer includes a third solid electrolyte, and
the third solid electrolyte is a solid electrolyte having an identical composition to the first solid electrolyte or is a solid electrolyte having an identical composition to the second solid electrolyte or including an identical crystal phase to the second solid electrolyte.

17. The battery according to claim 16, wherein
the third solid electrolyte is a solid electrolyte having an identical composition to the first solid electrolyte.

* * * * *